(12) United States Patent
Cuif

(10) Patent No.: US 6,455,018 B1
(45) Date of Patent: Sep. 24, 2002

(54) RECOVERY OF PRECIOUS METAL AND OTHER VALUES FROM SPENT COMPOSITIONS/MATERIALS

(75) Inventor: Jean-Pierre Cuif, Paris (FR)

(73) Assignee: Rhone-Poulenc Chimie, Courbevoie Cedex (FR)

( * ) Notice: Subject to any disclaimer, the term of this patent is extended or adjusted under 35 U.S.C. 154(b) by 0 days.

(21) Appl. No.: 08/441,113

(22) Filed: May 15, 1995

Related U.S. Application Data

(63) Continuation of application No. 08/241,718, filed on May 12, 1994, now abandoned.

(30) Foreign Application Priority Data

May 12, 1993 (FR) .............................................. 93 05697

(51) Int. Cl.[7] .......................... C22B 11/00; C22B 59/00
(52) U.S. Cl. .......................... 423/21.1; 423/22; 423/27; 423/28; 423/38; 423/39; 423/40; 423/41
(58) Field of Search .......................... 423/22, 45, 21.1, 423/27, 28, 38, 39, 40, 41; 75/744

(56) References Cited

U.S. PATENT DOCUMENTS

| | | | | | |
|---|---|---|---|---|---|
| 3,726,667 | A | * | 4/1973 | Fuchs ........................... | 423/45 |
| 3,958,985 | A | * | 5/1976 | Anderson ..................... | 423/45 |
| 3,985,854 | A | * | 10/1976 | Bradford et al. .............. | 423/22 |
| 4,166,737 | A | * | 9/1979 | Demarthe et al. ............ | 423/98 |
| 4,225,342 | A | * | 9/1980 | Freeman et al. .............. | 423/45 |
| 4,337,226 | A | * | 6/1982 | Peasley et al. ................ | 423/22 |
| 4,397,689 | A | * | 8/1983 | Lea et al. ...................... | 423/22 |
| 4,442,072 | A | * | 4/1984 | Baglin et al. ................. | 423/22 |
| 4,670,052 | A | * | 6/1987 | Stanley et al. ................ | 423/22 |
| 4,670,228 | A | | 6/1987 | Braaten ....................... | 423/21.1 |

FOREIGN PATENT DOCUMENTS

| | | | |
|---|---|---|---|
| EP | 0113649 | 7/1984 | |
| EP | 0155250 | 9/1985 | |
| EP | 0489494 | 6/1992 | |
| FR | 2373610 | 7/1978 | |
| FR | 2478672 | 9/1981 | |
| FR | 2672304 | 8/1992 | |
| JP | 58064327 | * 4/1983 | .................. 423/45 |
| SU | 127417 | * 1/1960 | .................. 423/45 |

OTHER PUBLICATIONS

C. F. Floe, "Extraction of Copper . . . Sulphuric Acid Baking," AI Min. Met. Eng., Tech. Pub. 768, 1937, no month.*

* cited by examiner

*Primary Examiner*—Steven Bos
(74) *Attorney, Agent, or Firm*—Burns, Doane, Swecker & Mathis, L.L.P.

(57) ABSTRACT

Precious metal values, e.g., platinum, palladium and rhodium, and, optionally, other valuable elements, e.g., one or more rare earths and cerium in particular, are recovered from a wide variety of compositions of matter and articles of manufacture, for example waste or spent catalysts such as vehicular postcombustion catalysts, by (i) optionally comminuting such composition/article into a finely divided state, (ii) intimately admixing the composition/article with sulfuric acid, (iii) calcining the resulting admixture at a temperature ranging from 150° to 450° C., and (iv) leaching the calcined admixture in an aqueous medium, whether simultaneously or separately, with $H^+$ ions and chloride ions, whereby obtaining (1) a solid residue substantially depleted of such precious metal values and, optionally, of such other elements, and (2) at least one liquid solution comprising such precious metal values and, optionally, such other elements.

36 Claims, No Drawings

RECOVERY OF PRECIOUS METAL AND OTHER VALUES FROM SPENT COMPOSITIONS/MATERIALS

This application is a continuation, of application Ser. No. 08/241,718, filed May 12, 1994, now abandoned.

BACKGROUND OF THE INVENTION

1. Field of the Invention

The present invention relates to the recovery of precious metals such as platinum, palladium, and rhodium, and optionally of other valuable elements, such as the rare earths and in particular cerium, from various compositions/materials comprised thereof, especially waste or spent catalysts, for example motor vehicle postcombustion catalysts.

2. Description of the Prior Art

It is known to this art that precious metals such as platinum, rhodium, palladium or iridium are currently widely used, whether alone or in combination, in a variety of industrial compositions, in particular catalyst compositions, and this optionally in conjunction with other valuable elements, such as, rare earths, for example, cerium.

Particularly exemplary such compositions are the so-called multifunctional catalysts (or "three-way" catalysts), and especially the catalysts for the treatment of the exhaust gases of internal combustion engines (motor vehicles or otherwise). Essentially for environmental protection reasons, considerable research and development in respect of such catalysts is presently ongoing (imposition of increasingly strict antipollution standards vis-a-vis the reduction of deleterious emissions of nitrogen oxides, of carbon monoxide and, equally, of unburned hydrocarbons).

Thus, at present, nearly 80% of the rhodium and 40% of the platinum values which are consumed worldwide are actually employed for the preparation of catalysts destined for the motor vehicle postcombustion sector. In view of the proportionately very high cost generated merely by the use of these precious metals in relation to the total cost of the finished catalysts, the recovery of same from a spent or waste catalyst for purposes of downstream recycling for the production of a new catalyst is a major desideratum in this art.

Processes for the recovery of the precious metals present in spent catalysts are described in the literature.

Particularly representative thereof are those which are principally based on a stage of acidic leaching of the spent catalysts containing the species to be recovered, this stage typically being carried out in the presence of an oxidizing agent.

Even more particularly according to these processes, the catalysts to be treated, which may either be in the form of pellets (beads, extrudates or the like) generally consisting of alumina, in particular of γ active alumina, containing the various precious metals (as well as, optionally, other valuable elements such as, for example, cerium), or in the form of monoliths consisting of a framework (or support) of the honeycomb type made of refractory ceramic, and in most cases based on cordierite (silicoaluminate) onto which a washcoat (or coating layer) of alumina, in particular of γ active alumina, is deposited, and also containing the precious metals (and other valuable elements), are preground and converted into a finely divided state. The powder thus obtained is then leached, one or more times, with strong inorganic acids such as sulfuric acid, hydrochloric acid or nitric acid, optionally in the presence of an oxidizing agent ($H_2O_2$, $Cl_2$, $HNO_3$ or other), whereby one or more leaching solutions are obtained containing the desired different precious metals in a dissolved form, these being subsequently recovered from such solutions by any technique which is appropriate and per se known to the art, in particular by selective precipitation.

However, processes such as those described above especially present the disadvantage of exhibiting solubilization, and hence recovery, yields in respect of the various desired precious metals (Pt, Pd, Rh and others) which remain insufficient, this being particularly more so in respect of the rhodium species. Furthermore, other than the precious metals, these processes only very rarely address the case of the recovery of the other valuable elements which may be present in the spent catalysts, such as, for example, the rare earths and, in particular, cerium.

SUMMARY OF THE INVENTION

Accordingly, a major object of the present invention is the provision of an improved process for the recovery, at very high efficiency, of the different precious metals, and in particular rhodium, which are present in various compositions, for example of waste or spent catalysts, as well as for the recovery of other valuable elements which may be present in said compositions, such as, for example, the rare earths and, in particular, cerium.

Briefly, the present invention features an improved process for the treatment of any composition or material containing species of the precious metal type and, optionally, rare earths such as cerium, for the recovery of such species, said process including the following stages:

(i) optionally, first converting the composition to be treated into a finely divided state to increase the reactivity thereof, (ii) intimately admixing this composition with sulfuric acid, (iii) calcining the mixture thus obtained at a temperature of from 150° C. to 450° C., and (iv) finally, treating the product thus calcined, in aqueous medium, on the one hand, with $H^+$ ions and, on the other, with chloride ions, this being carried out simultaneously or separately, whereby there are ultimately obtained, first, a solid residue substantially exhausted in respect of precious metals and, optionally, of rare earths such as cerium, and secondarily, one or more solutions containing the aforesaid species.

DETAILED DESCRIPTION OF BEST MODE AND PREFERRED EMBODIMENTS OF THE INVENTION

More particularly according to the present invention, the combination of the above stages (ii) and (iii) corresponds to an operation which, for simplicity, will subsequently often be deemed "sulfuric pasting."

The stage (iv) can be carried out essentially according to two different embodiments: (1) either, this being to selectively recover certain of the desired species, subjecting the calcined product to a double leaching by treating the product, first, with an acidic solution (introduction of the $H^+$ ions) and then, in a second step, with a solution containing chloride ions, whereby there are obtained, respectively, a first solution containing, for example, most of the cerium and a proportion of the rhodium, and a second solution containing, for example, most of the platinum and the remaining proportion of the rhodium; or (2) an overall recovery of the desired species is carried out by leaching all of these species simultaneously by treating the calcined product with a single solution having, on the one hand, the necessary acidity (introduction of the $H^+$ ions) and containing, on the other, the chloride ions.

Lastly, in either of the above alternative embodiments, the treatment with chloride ions is preferably carried out in the presence of an oxidizing agent.

The process according to the invention thus permits a selective or overall recovery, this being with very high efficiencies, of all of the species of the precious metal type or other valuable elements, in particular rhodium and cerium, which are present in the starting composition. It can reasonably be considered that the exceptionally high efficiencies thus obtained are essentially due to the preliminary sulfuric pasting stage which facilitates the subsequent leaching of the desired species.

According to the present invention, by the expression "precious metals" are intended, whether alone or in combination, all of the elements of the platinum group, namely the elements rhodium, palladium, iridium, platinum, ruthenium and osmium. Furthermore, by the expression "valuable element" are essentially intended the rare earths, namely the elements of the lanthanide series whose atomic numbers range from 57 to 71, inclusive, and more particularly cerium of atomic number 58, as well as yttrium of atomic number 39. Finally, by the expression "composition" are intended any composition containing one or more precious metals, optionally in combination with one or more valuable elements, and from which the recovery and subsequently the recycling of said species is intended.

Exemplary compositions that are treated via the process according to the invention include, more particularly, the waste or spent motor vehicle postcombustion catalysts, as well as the corresponding new catalysts when the latter comprise, for example, manufacturing scrap. Taking account of the fact that the process according to the invention is particularly suitable for the combined recovery of the precious metals and of the cerium valves which are present in such catalysts, and that this is a preferred embodiment thereof, the description which follows will be essentially delimited thereto.

The starting catalysts (which therefore contain the species to be recovered, such as precious metals and cerium) may be in various forms, namely, for example, and as indicated above, in the form of pellets or in the form of monoliths. It will be appreciated that such catalysts are widely described in the literature, both in respect of their structure and their composition, and including many patents and/or patent applications.

Thus, these catalysts are generally either essentially based on alumina (in the case of pellets) or, in the more particular case of the monoliths, essentially based on a refractory ceramic such as a silicoaluminate (for example cordierite) in the support phase and based on alumina in the washcoat phase. However, the treatment of a catalyst of monolith type in which the honeycomb (or support) is fabricated not of a conventional ceramic, but of a metal or of a metal alloy, is obviously also within the ambit of the invention; for this purpose, it suffices to first merely extract the washcoat from the support using appropriate mechanical and/or chemical means, and then to treat this washcoat according to the invention, to recover its precious metals or cerium values therefrom.

With catalysts of spent or waste type, it will be appreciated that the latter generally contain various impurities, such as lead, carbonaceous substances and the like. However, the process of the invention is insensitive to the presence of these impurities.

The process according to the invention is particularly suited for the combined recovery of the precious metals and of the cerium values which are present in spent catalysts of the monolith type, comprising a support substrate of cordierite coated with a washcoat of alumina.

According to the first optional stage of the process according to the invention, grinding of the starting catalyst is first carried out. Although this stage is not truly essential, it is nevertheless preferred, in particular in the case of a catalyst which is in a form of a monolith. The catalyst is thus converted into a finely divided state, in particular into the form of a powder whose mean particle size may range, for example from a few microns to a few millimeters. This state enables preparation of a product which is, on the one hand, chemically more homogeneous and, on the other, more reactive in respect of the subsequent process parameters according to the invention.

In another optional embodiment of the process of the invention, the starting catalyst, optionally after grinding, may next be subjected to a thermal pretreatment (calcination) conducted under a reducing atmosphere, for example a mixture of argon and hydrogen, this being at a temperature which generally ranges from 300 to 800° C. The object of such an operation is not only to render the precious metals still more reactive, but also the cerium present in the spent catalyst, by removing any oxide layer which may be coating said precious metals and/or by reducing the cerium initially present in an oxidation state of +4 to cerium in an oxidation state of +3, which has been determined to be more easily leachable.

According to an essential first characteristic of the process of the invention, the catalyst powder is next intimately admixed with sulfuric acid. The amount of sulfuric acid, expressed as pure $H_2SO_4$, employed in this stage advantageously ranges from approximately 0.4 to 5 times the weight of the catalyst powder to be treated, and preferably ranges from 0.5 to 2 times this weight, and still more preferably from 0.8 to 1.5 times such weight. It will be appreciated that the use of quantities of acid which are larger than approximately 5 times the weight of catalyst as indicated above, while theoretically possible, does not present any particular advantage or significantly improved results. Thus, no benefit is seen from a practical viewpoint.

In most cases the sulfuric acid is used in the form of a solution, generally aqueous, the latter preferably being relatively concentrated, namely, its sulfuric acid content is more than 50% by weight and, still more preferably, more than 80% by weight. It is of course also possible to use sulfuric acids diluted in other solvents, or to use pure sulfuric acid. It too will be appreciated that the purity and/or the quality of the acid introduced is not really important and, in particular, it is possible to use residual sulfuric acids or acids originating, for example, from the roasting of sulfide ores, especially blende ores. This adds considerably to the advantage and the economics of the process of the invention.

After the above products have been mixed until a more or less solid composition has been formed and obtained, which in most cases has the appearance of a greyish paste, calcining of the resulting physical mixture is next carried out, generally in air.

This calcination is typically conducted at a temperature of from 150° C. to 450° C., in particular from 200° C. to 400° C., this being for a sufficient time (which depends in particular on the quantity of pasted catalyst) to ultimately produce a brittle whitish solid, designated "baked sulfates."

During this stage, deemed sulfuric pasting, chemical reactions are initiated and take place in the mixture based on catalyst and sulfuric acid. In particular, on the one hand, the release of acidic white fumes originating from the decomposition of sulfuric acid and, on the other, the conversion of the chemical species present into sulfates are observed.

It will here be appreciated that a proportion of the sulfuric acid which is employed for the pasting can be recycled into the process by treating the acidic white fumes which are released during the formation of the baked sulfates.

In accordance with another essential characteristic of the process of according to the invention, the precious metals and the cerium which are present in the composition originating from the sulfuric pasting stage must next be leached.

As indicated above, this leaching can then be carried out according to two alternative embodiments.

According to the first alternative embodiment, the baked sulfates are first leached with an acidic solution. The first leaching, which is preferably conducted at a temperature of at least 50° C., is next followed by a filtration which thus makes it possible to obtain, on the one hand, a first filtrate and, on the other, a first solid residue. This first filtrate (acidic sulfate solution) then contains most of the cerium (at least 70%) and of the rhodium (approximately two thirds) which were initially present in the catalyst, but is, one the other hand, substantially free from any platinum values. Then, in a second stage, a leaching of said first residue is carried out, this time using a solution containing, on the one hand, chloride ions and, on the other, preferably an oxidizing agent.

After the digestion, the resulting suspension is filtered and thus produces a second filtrate and a second solid residue. This second leaching, which is preferably carried out with the solution boiling, makes it possible, in turn, to dissolve and to recover in the second filtrate (acidic chlorosulfates solution) most of the platinum which was present in the starting catalyst, as well as the remaining quantities of cerium and rhodium which were not leached out during the first operation. It too will be appreciated that the first or second solid residues referred to above may be washed with water, or, with an acidic aqueous solution, to recover the impregnating liquors and possibly the small amounts of platinum or rhodium which are still adsorbed. In this case, the aqueous washes are then mixed with the first and second filtrates respectively. Finally, it will also be appreciated that the second residue may optionally be recycled, either to the pasting stage, or to the first leaching stage, or to the second leaching stage.

According to a second alternative embodiment of the process of the invention, which is preferred to the first, the baked sulfates are leached with a single acidic solution containing chloride ions as well as, preferably, an oxidizing agent. This leaching is preferably carried out at a temperature of at least 50° C. and still more preferably with the solution boiling.

In this case, after leaching, a suspension is obtained which is next filtered, and this provides, on the one hand, a filtrate which then contains all of the precious metals and the cerium which were present in the starting catalyst, and a solid digestion residue.

This second alternative embodiment presents the advantage, when compared with the first, of permitting the precious metals and the cerium to be simultaneously dissolved in a single stage and with very high efficiencies.

It should be noted, furthermore, that all of the considerations in the context of the first alternative embodiment in respect of the possibilities of washing and/or recycling the digestion residue are similarly applicable to the second alternative embodiment.

The following general comments are made concerning either of the alternative embodiments described above.

Exemplary oxidizing agents that can be employed, whether alone or in admixture, according to the present invention include hydrogen peroxide, nitric acid, chlorine, sodium persulfate and oxygen. The function of this oxidizing agent is to oxidize the platinum, the palladium and the rhodium and to render these species more soluble during the leaching stages. The amounts of oxidizing agents which are introduced, therefore, generally correspond to the stoichiometric amounts in relation to the total amount of the oxidizable platinum, palladium and rhodium values which are present in the mixture.

The chloride ions, in turn, may be introduced in the form of hydrochloric acid, gaseous chlorine or salts, for example alkali and/or alkaline earth metal chlorides such as sodium chloride, potassium chloride, calcium chloride, ammonium chloride and the like. The function of these chloride ions according to the invention is to permit complexing of the platinum and of a proportion of the rhodium. To this end, the amounts of chloride ions to be used correspond at least to the stoichiometry necessary in relation to the oxidized platinum, palladium and rhodium species present in the mixture.

Finally, the necessary acidity of the leaching solutions to be used in accordance with the invention may be introduced using many acids, in particular strong inorganic acids such a sulfuric acid, nitric acid, or hydrochloric acid. The concentrations of acid in the initial leaching solutions are then fixed such that the pH of the solutions obtained directly after the leaching stage (second alternative embodiment) or stages (first alternative embodiment) is still lower than or equal to 2 and preferably lower than or equal to 1. Indeed, with final pH values higher than 2, problems of insolubility of certain species in the mixture can then arise.

It will be appreciated that the same single compound can therefore play a number of roles according to the invention, namely, to provide at the same time the acidity and/or the chloride ions and/or the oxidizing nature which are necessary for its use. This is the case, for example, with hydrochloric acid HCl ($H^+$ acidity and $Cl^-$ ions), with nitric acid ($H^+$ acidity and oxidizing nature) and with chlorine ($Cl^-$ ions and oxidizing nature).

A particular and advantageous attribute of the second alternative embodiment of the process according to the invention as described above (a single leaching stage), is when the sole leaching solution employed in stage (iv) is a sulfuric acid solution (introduction of $H^+$ ions) containing alkali metal chlorides such as, for example, sodium, potassium or ammonium chlorides (introduction of chloride ions). In this particular case, and assuming that the initial composition being processed contains cerium, the simultaneous presence of, on the one hand, sulfate ions and, on the other, alkali metal ions ($NA^+$, $K^+$, $NH_4^+$, etc.) in the processing solution results in the formation of cerium alkali metal double sulfates which are compounds that are insoluble under the conditions of processing. These compounds, therefore, do not go into solution with the precious metals and thus remain, after filtration, with the solid digestion residue. This constitutes a particularly advantageous and efficient means for carrying out a recovery which is selective between, on the one hand, the precious metals and, on the other, cerium, while remaining within the scope of the second alternative embodiment of the process of the invention. The cerium can subsequently be recovered from the solid residue by any technique which is per se known to this art, for example by selective redissolving.

The precise metals, and optionally the cerium which are present in the solutions originating from the leaching stages described above can subsequently be recovered from the latter by any appropriate technique which is per se known to this art, in particular by precipitation, cementation, liquid/liquid extraction or else ion exchange and then optionally be finally purified. The precious metals and/or cerium which are thus obtained can then be used again for the manufacture of new catalysts.

In order to further illustrate the present invention and the advantages thereof, the following specific examples are given, it being understood that same are intended only as illustrative and in nowise limitative.

EXAMPLE 1

A conventional spent motor vehicle postcombustion catalyst of monolith type, i.e., cordierite honeycomb coated with a washcoat of alumina, was crushed and then ground into a fine powder having a mean particle size on the order of 10 μm ($\Phi_{50}$) The weight composition (in %) of this powder was as follows:

O=43.7%

Al=20.3%

Si=17.7%

Mg=6.0%

Ce=2.9%

Fe=1.0%

Pt=1,600 ppm

Rh=380 ppm

Trace amounts of other elements.

40 g of this powder were then mixed with 112 g of a solution containing 95% by weight of sulfuric acid. The mixture thus obtained, which then had the appearance of a greyish viscous paste, was placed into a furnace and calcined therein for 3 hours at 300° C in air.

77 g of "baked sulfates" were thus obtained, of which 75 g were next subjected to a leaching stage carried out for 1 hour and at 90° C. using 400 ml of a 6N sulfuric acid solution.

After filtration of the suspension, followed by washing of the solid residue with 100 ml of deionized water, a first filtrate (incorporating the aqueous washes) was obtained, which exhibited the following characteristics:

| Element | Content (mg/l) | Weight solubilization yield (%) |
| --- | --- | --- |
| Pt | 1.2 | 1 |
| Rh | 17 | 69 |
| Ce | 1660 | 88 |

The solid residue obtained above was next leached for 15 min and at boiling temperature with a solution which had been prepared by using 1,280 ml of a 6N aqueous hydrochloric acid solution and 96 ml of an aqueous hydrogen peroxide solution at a concentration of 30%.

After filtration of the suspension, followed by washing of the solid residue with 100 ml of deionized water, a second filtrate (incorporating the aqueous washes) was obtained, which exhibited the following characteristics:

| Element | Content (mg/l) | Weight solubilization yield (%) |
| --- | --- | --- |
| Pt | 40 | 94 |
| Rh | 3 | 29 |
| Ce | 93 | 12 |

Thus, at the end of the process, the total weight recovery yields of the various desired species which were present in the initial catalyst, were as follows:

Pt: 95%

Rh: 98%

Ce: 100%

EXAMPLE 2

The procedure of Example 1 was repeated (same starting catalyst, same preliminary pasting conditions), except that the resulting "baked sulfates" were in this instance leached in a single stage by means of a single solution which had been obtained by mixing 200 ml of a 6N aqueous sulfuric acid solution, 150 ml of a 6N aqueous hydrochloric acid solution and 15 g of an aqueous hydrogen peroxide solution at a concentration of 30%.

After filtration of the suspension, followed by washing of the solid residue with 150 ml of a 6N aqueous hydrochloric acid solution, a filtrate was obtained (incorporating the aqueous washes), which exhibited the following characteristics:

| Element | Content (mg/l) | Weight solubilization yield (%) |
| --- | --- | --- |
| Pt | 125 | 98 |
| Rh | 28 | 93 |
| Ce | 2,190 | 95 |

EXAMPLE 3

The procedure of Example 2 above was repeated identically, except that the single leaching stage was carried out without sulfuric acid, the single leaching solution employed in this instance having been obtained by mixing 300 ml of a 6N aqueous hydrochloric acid solution and 30 g of an aqueous hydrogen peroxide solution at a concentration of 30%.

A filtrate was then obtained (incorporating the aqueous washes), which exhibited the following characteristics:

| Element | Content (mg/l) | Weight solubilization yield (%) |
| --- | --- | --- |
| Pt | 130 | 98 |
| Rh | 28 | 89 |
| Ce | 1,340 | 56 |

EXAMPLE 4

(Comparative)

This Example illustrates the importance of the presence of chloride ions during the leaching of the "baked sulfates."

The procedure of Example 2 above was repeated identically, except that the single leaching stage was carried out by means of a solution which had been obtained by mixing 300 ml of a 6N aqueous sulfuric acid solution and 30 g of an aqueous hydrogen peroxide solution at a concentration of 30% (absence of chloride ions).

A filtrate was then obtained (incorporating the aqueous washes), which exhibited the following characteristics:

| Element | Content (mg/l) | Weight solubilization yield (%) |
|---|---|---|
| Pt | 0.03 | 0.03 |
| Rh | 20 | 59 |
| Ce | 2,360 | 91 |

The chloride ions therefore had a very considerable effect on the solubilization of platinum, and also partially on the solubilization of rhodium. In contrast, this effect was virtually nil in the case of cerium.

EXAMPLE 5
(Comparative)

This Example illustrates various tests which were conducted without employing a preliminary pasting stage in accordance with the invention, but merely leachings carried out on the catalyst powder described in Example 1.

The operating conditions of these tests are indicated below:

Test 1: 100 g of powder leached for 1 h, 30 min, and at boiling, using the following solution: 15N $HNO_3$ (50 ml)+12N HCl (150 ml).

Test 2: Identical with Test 1, except that, before leaching, the catalyst powder was first calcined at 600° C. for 1 h under a reducing atmosphere of argon containing 10 % of $H_2$.

Test 3: Identical with Test 1, except that, before leaching, the catalyst powder was first calcined at 1,000° C. in air for 1 h.

Test 4: 50 g of powder leached for 1 h, 30 min, and at boiling using 250 ml of a 7N $H_2SO_4$ solution.

For each of these tests, the weight solubilization yields (in %) of the various desired species were as follows:

| Test | Species | | |
|---|---|---|---|
| | Pt | Rh | Ce |
| 1 | 81 | 37 | 17 |
| 2 | 96 | 47 | 21 |
| 3 | 85 | 13 | 10 |
| 4 | 0 | 2.4 | 9 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the recovery of precious metal values and, optionally, other elements, from a waste or spent vehicular postcombustion catalyst, comprising (i) optionally comminuting said catalyst into a finely divided state, (ii) intimately admixing said catalyst with sulfuric acid to form an admixture, (iii) calcining said admixture at a temperature ranging from 150° C. to 450° C. to form a calcined admixture, and (iv) leaching the calcined admixture in an aqueous leach medium with $H^+$ ions and chloride ions, and obtaining (1) a solid residue substantially depleted of said precious metal values and, optionally, of said other elements, and (2) at least one liquid solution comprising said precious metal values and, optionally, said other elements.

2. The process as defined by claim 1, comprising simultaneously leaching said calcined admixture with said $H^+$ and said chloride ions.

3. The process as defined by claim 1, comprising separately leaching said calcined admixture with said $H^+$ and said chloride ions.

4. The process as defined by claim 3, comprising first leaching said calcined admixture with said $H^+$ ions, separating a solid residue from the leach medium, and then leaching said solid residue with said chloride ions.

5. The process as defined by claim 1, comprising leaching said calcined admixture with said chloride ions in the presence of an oxidizing agent.

6. The process as defined by claim 1, comprising thermally treating said catalyst in a reducing atmosphere before said intimate admixing step (ii).

7. The process as defined by claim 6, comprising thermally treating at a temperature ranging from 300° C. to 800° C.

8. The process as defined by claim 1, wherein in step (ii) the amount of sulfuric acid, expressed as $H_2SO_4$, ranges from 0.4 to 5 times the weight of said catalyst.

9. The process as defined by claim 8, said amount of sulfuric acid ranging from 0.5 to 2 times the weight of said catalyst.

10. The process as defined by claim 9, said amount of sulfuric acid ranging from 0.8 to 1.5 times the weight of said catalyst.

11. The process as defined by claim 1, wherein step (ii) comprises intimately admixing said catalyst with an aqueous solution of sulfuric acid.

12. The process as defined by claim 11, said aqueous solution comprising greater than 50% by weight of sulfuric acid.

13. The process as defined by claim 12, said aqueous solution comprising greater than 80% by weight of sulfuric acid.

14. The process as defined by claim 1, wherein step (ii) comprises intimately admixing said catalyst with a residual sulfuric acid, or a sulfuric acid produced by the roasting of a sulfide ore.

15. The process as defined by claim 1, wherein step (iv) comprises leaching at a temperature of at least 50° C.

16. The process as defined by claim 15, wherein step (iv) comprises leaching at the boiling temperature of the leach medium.

17. The process as defined by claim 1, comprising filtering said solid residue (1) from said at least one solution (2).

18. The process as defined by claim 1, comprising washing said solid residue (1) with water or an aqueous acid solution.

19. The process as defined by claim 18, comprising incorporating said aqueous washes into said at least one liquid solution (2).

20. The process as defined by claim 1, comprising recycling said solid residue (1) to any of said steps (ii) to (iv).

21. The process as defined by claim 5, said oxidizing agent comprising hydrogen peroxide, nitric acid, chlorine, sodium persulfate, oxygen, or mixture thereof.

22. The process as defined by claim 1, said chloride ions comprising hydrochloric acid, gaseous chlorine, or an alkali or alkaline earth metal chloride.

23. The process as defined by claim 1, said $H^+$ ions comprising a strong inorganic acid.

24. The process as defined by claim 23, said strong inorganic acid comprising sulfuric acid, nitric acid, hydrochloric acid, or mixture thereof.

25. The process as defined by claim 1, the concentration of said $H^+$ ions being such that the pH of the leach medium is less than or equal to 2.

26. The process as defined by claim 25, said pH being less than or equal to 1.

27. The process as defined by claim 1, said precious metal values comprising platinum, palladium, rhodium, iridium ruthenium, osmium, or a mixture thereof.

28. The process as defined by claim 1, said catalyst comprising rare earth values.

29. The process as defined by claim 28, said rare earth values comprising cerium.

30. The process as defined by claim 1, said catalyst comprising alumina-based pellets.

31. The process as defined by claim 1, said catalyst comprising a washcoated honeycomb.

32. The process as defined by claim 1, said catalyst comprising a monolith.

33. The process as defined by claim 31, said honeycomb comprising a refractory ceramic and said washcoat comprising alumina.

34. The process as defined by claim 33, said refractory ceramic comprising a silicoaluminate.

35. The process as defined by claim 1, said catalyst comprising platinum, rhodium and cerium values.

36. The process as defined by claim 1, comprising recovering said precious metal values and, optionally, said other elements, from said at least one solution (2).

* * * * *